United States Patent (10) Patent No.: US 8,395,821 B2
Tsukahara et al. (45) Date of Patent: Mar. 12, 2013

(54) IMAGE READING APPARATUS

(75) Inventors: Hajime Tsukahara, Kanagawa (JP);
Tohru Kanno, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 591 days.

(21) Appl. No.: 12/624,582

(22) Filed: Nov. 24, 2009

(65) Prior Publication Data

US 2010/0142009 A1 Jun. 10, 2010

(30) Foreign Application Priority Data

Dec. 5, 2008 (JP) ................ 2008-310828

(51) Int. Cl.
*H04N 1/407* (2006.01)
*H04N 1/40* (2006.01)
*H04N 1/04* (2006.01)
*H04N 5/228* (2006.01)
*H04N 9/73* (2006.01)
*G06K 1/00* (2006.01)
*G06K 9/00* (2006.01)

(52) U.S. Cl. ....... 358/3.26; 358/3.24; 358/1.9; 358/475; 358/448; 358/486; 358/483; 358/461; 348/657; 348/222.1; 382/167

(58) Field of Classification Search .................. 358/475, 358/1.9, 3.24, 448, 486, 483, 461; 348/657; 348/222.1; 382/167

See application file for complete search history.

(56) References Cited

U.S. PATENT DOCUMENTS

| 7,391,533 | B2* | 6/2008 | Hiromatsu ................ 358/1.9 |
| 2003/0038983 | A1* | 2/2003 | Tanabe et al. ............. 358/461 |
| 2007/0216915 | A1 | 9/2007 | Tsukahara |
| 2008/0231918 | A1* | 9/2008 | Nagase .................... 358/483 |

FOREIGN PATENT DOCUMENTS

| JP | 2-285772 | 11/1990 |
| JP | 2002-290685 | 10/2002 |
| JP | 2003-198813 | 7/2003 |
| JP | 2007-158663 | 6/2007 |

OTHER PUBLICATIONS

Japanese Office Action issued Jul. 10, 2012 in Patent Application No. 2008-310828.

* cited by examiner

*Primary Examiner* — Charlotte M Baker
*Assistant Examiner* — Rury Grisham
(74) *Attorney, Agent, or Firm* — Oblon, Spivak, McClelland, Maier & Neustadt, L.L.P.

(57) ABSTRACT

When a light source is in off state, a gray level of image data on a pixel-by-pixel basis is generated as a first black level and an average of gray levels of a portion of the image data corresponding to optical black image portions of sensor chips is generated as a second black level. After that, when an image of an original is read, an average of gray levels of the black image data on a line-by-line basis is generated as a third black level. The first black level is subtracted from a gray level of the image data on a line-by-line basis (an offset correction), and a difference between the third black level and the second black level is added to a gray level of the image data after being subjected to the subtraction on a line-by-line basis.

15 Claims, 6 Drawing Sheets

IMAGE READING APPARATUS

CROSS-REFERENCE TO RELATED APPLICATIONS

The present application claims priority to and incorporates by reference the entire contents of Japanese Patent Application No. 2008-310828 filed in Japan on Dec. 5, 2008.

BACKGROUND OF THE INVENTION

1. Field of the Invention

The present invention relates to an image reading apparatus for reading an image of an original, such as an image scanner. The reading apparatus could be an image reading unit mounted on an image forming apparatus, such as a digital copier or a facsimile machine, or a stand-alone image reading apparatus.

2. Description of the Related Art

A typical image reading apparatus includes an image reading means for scanning the printed side of an original in a main scanning direction with a light source turned on and performing a photoelectric conversion of a reflected light from the printed side on a line-by-line basis with a photoelectric conversion element to read as an analog image signal and an A/D conversion means for converting the analog image signal read by the image reading means into a digital image signal and outputting the digital image signal.

Moreover, the image reading apparatus detects (generates), as a black level, a gray level of a digital image signal output from the A/D conversion means and holds the black level. The black level is detected based on a gray level of a digital image signal output from the A/D conversion means in a state where no light enters the photoelectric conversion element as a reference level. When reading an image of an original, the image reading apparatus performs an offset correction, for eliminating an offset, by subtracting the black level from a gray level of a digital image signal output from the A/D conversion means. A CCD (Charge Coupled Device) can be used in a photoelectric conversion element. The CCD has one output buffer corresponding to a group of pixels so that the black level varies per output buffer. Therefore, when a CCD is employed in a photoelectric conversion element, a common black level is subtracted from the value of each pixel in the group of pixels corresponding to an output buffer.

In general, a photoelectric conversion element in which a CCD is employed has an effective image portion and an optical black (hereinafter, referred to as "OPB") portion. The OPB is a portion on which the light does not fall. A black level, i.e., a gray level of a portion of a digital image signal corresponding to the OPB portion (hereinafter, referred to as simply "the black level of the OPB portion") is detected and held (for example, see Japanese Patent Application Laid-open No. 2007-158663).

On the other hand, a CMOS (Complementary Metal Oxide Semiconductor) can be employed in a photoelectric conversion element instead of a CCD. A CMOS has one output buffer for every pixel so that the black level varies per pixel. As a result, when a CMOS is employed in a photoelectric conversion element, a normal offset correction cannot be performed by subtracting a value of the black level of the OPB portion with respect to all the pixels as in the case of the CCD. Therefore, in general, pixel-by-pixel black levels are detected with a light source turned off and held in advance before an image of an original is read, and an offset correction is performed by subtracting the respective black levels on a pixel-by-pixel basis when an image of the original is read.

Image reading apparatuses is which a contact image sensor (CIS) is employed as a reading system are known in the art. On the other hand, CISs in which a plurality of sensor IC chips, a photoelectric conversion element that employs a CMOS, are arranged, for example, in a zigzag manner shown in FIG. 8 (i.e., aligned along the main scanning direction with an overlap between adjacent sensors), and combined with a 1×-magnification optical system are known in the art.

An image reading apparatus in which a CIS is employed detects a black level on a pixel-by-pixel basis and holds the detected black level, and subtracts the black level on a pixel-by-pixel basis when reading an image of an original.

However, in an image reading apparatus in which a CIS is employed, differences in black level among sensor IC chips are caused by temperature characteristics of the sensor IC chips and variation factors with respect to each of the sensor IC chips, such as a circuit path. The differences in black level among sensor IC chips can not be corrected. The reason is that, after pixel-by-pixel black levels have been generated, the black levels vary when an image of an original is read, and thus the differences in black level cannot be eliminated by the pixel-by-pixel black-level correction (offset correction) performed before an image of the original is read.

SUMMARY OF THE INVENTION

It is an object of the present invention to at least partially solve the problems in the conventional technology.

According to an aspect of the present invention, there is provided an image reading apparatus including an image reading unit configured to scan a printed side of an original in a main scanning direction with a light source turned on and to perform a photoelectric conversion of a reflected light from the printed side on a line-by-line basis with a photoelectric conversion element to read as an analog image signal; an analog-to-digital conversion unit configured to convert the analog image signal read by the image reading unit into a digital image signal and outputting the digital image signal; a first-black-level generating unit configured to generate, as a first black level, a gray level of the digital image signal outputted from the analog-to-digital conversion unit on a pixel-by-pixel basis in a state where the light source is turned off; a second-black-level generating unit configured to generate, as a second black level, an average of gray levels of a portion of the digital image signal outputted from the analog-to-digital conversion unit that corresponds to an optical black image portion in the photoelectric conversion element when the first-black-level generating unit generates the first black level generated on the pixel-by-pixel basis; a third-black-level generating unit configured to generates, as a third black level, an average of gray levels of the portion of the digital image signal outputted from the analog-to-digital conversion unit that corresponds to the optical black image portion in the photoelectric conversion element when an image of the original is read; and an offset correction unit configured to perform an offset correction of the gray level of the digital image signal outputted from the analog-to-digital conversion unit when an image of the original is read based on the first black level generated by the first-black-level generating unit and a difference between the third black level generated by the third-black-level generating unit and the second black level generated by the second-black-level generating unit.

According to another aspect of the present invention, there is provided an image reading apparatus including an image reading unit configured to scan a printed side of an original in a main scanning direction with a light source turned on and to perform a photoelectric conversion of a reflected light from the printed side on a line-by-line basis with a photoelectric conversion element to read as an analog image signal; an analog-to-digital conversion unit configured to convert the analog image signal read by the image reading unit into a digital image signal and outputting the digital image signal; a first-black-level generating unit configured to generate, as a first black level, a gray level of a portion of the digital image signal outputted from the analog-to-digital conversion unit that corresponds to the photoelectric conversion element on a pixel-by-pixel basis in a state where the light source is turned off; a second-black-level generating unit configured to generate, as a second black level, an average of gray levels of a portion of the digital image signal outputted from the analog-to-digital conversion unit that corresponds to an optical black image portion in the photoelectric conversion element when the first-black-level generating unit generates the first black level generated on the pixel-by-pixel basis; a third-black-level generating unit configured to generates, as a third black level, an average of gray levels of the portion of the digital image signal outputted from the analog-to-digital conversion unit that corresponds to the optical black image portion in the photoelectric conversion element when an image of the original is read; a first offset correction unit configured to perform an offset correction by subtracting the first black level generated by the first-black-level generating unit from the gray level of the digital image signal outputted from the analog-to-digital conversion unit when an image of the original is read; and a second offset correction unit configured to perform an offset correction with respect to the analog image signal read by the image reading unit when an image of the original is read based on a difference between the third black level generated by the third-black-level generating unit and the second black level generated by the second-black-level generating unit. The analog-to-digital conversion unit converts the analog image signal subjected to the offset correction by the second offset correction unit into a digital image signal when an image of the original is read.

According to still another aspect of the present invention, there is provided an image reading apparatus including an image reading means for scanning a printed side of an original in a main scanning direction with a light source turned on and performing a photoelectric conversion of a reflected light from the printed side on a line-by-line basis with a photoelectric conversion element to read as an analog image signal; an analog-to-digital conversion means for converting the analog image signal read by the image reading means into a digital image signal and outputting the digital image signal; a first-black-level generating means for generating, as a first black level, a gray level of the digital image signal outputted from the analog-to-digital conversion means on a pixel-by-pixel basis in a state where the light source is turned off; a second-black-level generating means for generating, as a second black level, an average of gray levels of a portion of the digital image signal outputted from the analog-to-digital conversion means that corresponds to an optical black image portion in the photoelectric conversion element when the first-black-level generating means generates the first black level generated on the pixel-by-pixel basis; a third-black-level generating means for generating, as a third black level, an average of gray levels of the portion of the digital image signal outputted from the analog-to-digital conversion means that corresponds to the optical black image portion in the photoelectric conversion element when an image of the original is read; and an offset correction means for performing an offset correction of the gray level of the digital image signal outputted from the analog-to-digital conversion means when an image of the original is read based on the first black level generated by the first-black-level generating means and a difference between the third black level generated by the third-black-level generating means and the second black level generated by the second-black-level generating means.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are concretely described below with reference to the accompanying drawings. Incidentally, in the embodiments, an image reading apparatus including an automatic document feeder (ADF) is taken as an example. The image reading apparatus conveys an original to be read to a fixed image reading unit that reads an image of the original while the original moves at a predetermined speed.

First, the configuration of the image reading apparatus according to an embodiment of the present invention is explained with reference to FIG. 1.

Figure 1:
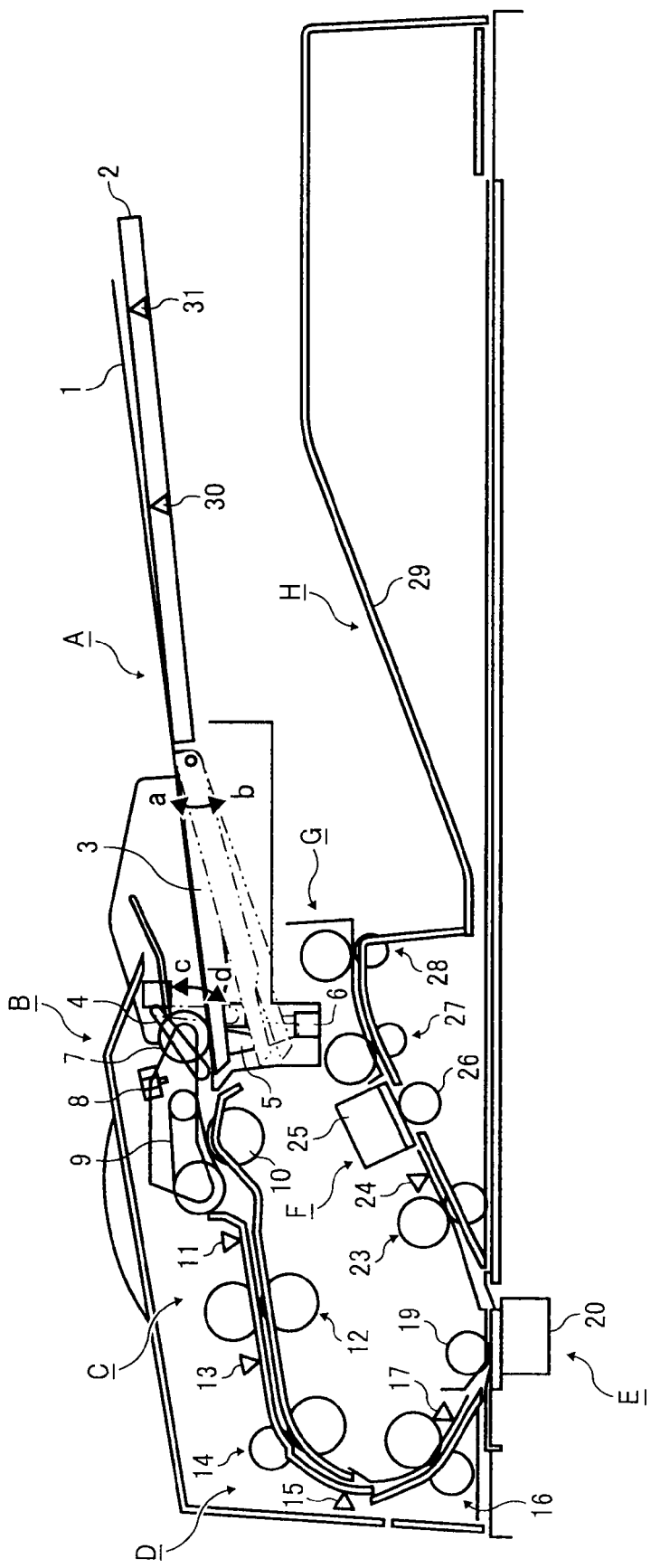
FIG. 1 is a diagram illustrating an example of the configuration of a mechanical part of an image reading apparatus according to an embodiment of the present invention.

FIG. 1 is a diagram illustrating an example of the configuration of a mechanical part of the image reading apparatus according to an embodiment of the present invention.

Figure 2:
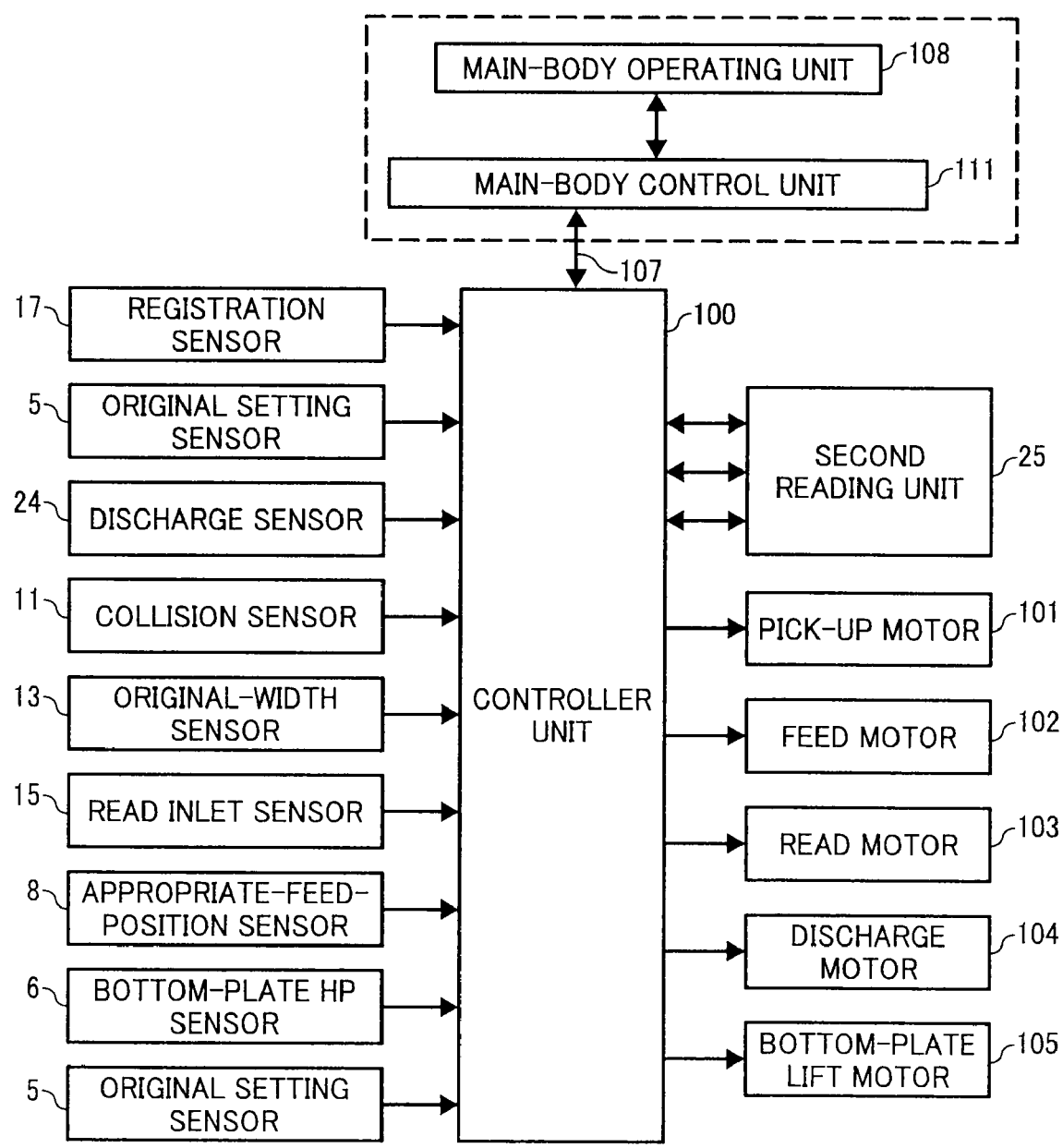
FIG. 2 is a block diagram illustrating an example of the configuration of a control system of the image reading apparatus.

FIG. 2 is a block diagram illustrating an example of the configuration of a control system of the image reading apparatus. Incidentally, for the sake of convenience, a first reading unit 20 shown in FIG. 1 is not shown in FIG. 2.

The image reading apparatus includes an original setting unit A where a stack of originals is set; a separating-and-feeding unit B that separates an original from the stack of originals set in the original setting unit A and feeds the original to the subsequent unit; a registration unit C that receives the original from the separating-and-feeding unit B and aligns the original as a result of collision of the original with the registration unit C and serves to pull and convey the aligned original; a turning unit D that receives the original from the registration unit C and turns the original so that the side of the original to be read (i.e., the printed side if the original is a single-sided original, the obverse side if the original is a double-sided original) faces the reading side (downward); a first reading-and-conveying unit E that reads an image of the obverse side of the original from beneath a contact glass; a second reading-and-conveying unit F that reads an image of the reverse side of the original (the double-sided original) after the image of the obverse side has been read; a discharging unit G that discharges the original after the image of the obverse side or the images of the both sides have been read to the outside of the apparatus; a stacking unit H where the originals after completion of their reading are stacked and stored; drive units 101 to 105 that activate these convey actions; and a controller unit 100 that controls a sequence of actions.

A stack of originals 1 to be read is set up on an original table 2 of the original setting unit A. The original table 2 includes a movable original table 3. The stack of originals 1 is set so as to face up the printed side (the obverse side if double-sided originals). The positioning of the stack of originals 1 in a width direction (a direction perpendicular to a conveying direction) is made with a side guide (not shown). Whether an original has been set in the original table 2 including the movable original table 3 is detected with a setting feeler 4 and an original setting sensor 5. The result of detection is transmitted from the controller unit 100 to a main-body control unit 111 via an interface (hereinafter, referred to as "I/F") 107.

Moreover, by any of original-length detection sensors 30 and 31 provided on a table top of the original table 2 (a reflective sensor or an actuator type sensor capable of detecting even one original is used), an outline of the length of the original in the conveying direction is determined. Incidentally, to allow the determination, the sensors need to be arranged so as to determine at least the height or the width of the same original.

The movable original table 3 can move up and down in directions "a" and "b" shown in FIG. 1 by the action of a bottom-plate lift motor 105. The movable original table 3 is ordinarily located at a home position (HP) where it can be detected by a bottom-plate HP sensor 6.

When the setting feeler 4 and the original setting sensor 5 detect that the originals are set up, the controller unit 100 receives the result of detection. Subsequently, the controller unit 100 causes the bottom-plate lift motor 105 to rotate in the normal direction to lift up the movable original table 3 to the position where the top surface of the stack of originals 1 comes in contact with a pick-up roller 7.

The pick-up roller 7 rotates in directions "c" and "d" shown in FIG. 1 by the action of a pick-up motor 101 and a cam mechanism. As the movable original table 3 is lifted up, the pick-up roller 7 is pressed against the top surface of the originals on the movable original table 3 and moved up in the direction "c", and an upper limit can be detected by an appropriate-feed-position sensor 8.

When a "PRINT" key on a main-body operating unit 108 is operated, the main-body control unit 111 is notified of this operation via an I/F 106. Subsequently, the main-body control unit 111 transmits an original feed signal to the controller unit 100 via the I/F 107. When the controller unit 100 receives the original feed signal, the pick-up roller 7 is driven to rotate by normal rotation of a feed motor 102, and picks up a few originals (ideally, one original) from the stack of originals 1 on the original table 2. A direction of the rotation of the pick-up roller 7 is the same as the direction of conveying (feeding) the top original to a feed opening.

By the normal rotation of the feed motor 102, a feed belt 9 is driven to move in the feeding direction, and a reverse roller 10 in the separating-and-feeding unit B is driven to rotate in a direction opposite to the feeding direction, so the top original is separated from the stack of originals 1 and fed.

To explain in more detail, the reverse roller 10 is in contact with the feed belt 9 by applying a predetermined pressure on the feed belt 9. When being in contact with the feed belt 9 directly or via one original, the reverse roller 10 is pulled by the movement of the feed belt 9, and rotates in a counterclockwise direction. In case two or more originals come in between the feed belt 9 and the reverse roller 10, the pulling force is set to be lower than torque of a torque limiter, and the reverse roller 10 is driven to rotate in a clockwise direction, which is an original driving direction, to serve to push the excess original(s) back, so it is possible to feed the originals one by one.

The one original separated by the action of the feed belt 9 and the reverse roller 10 is further fed by the feed belt 9, and a leading end of the original is detected by a collision sensor 11 in the registration unit C. Then, the original is further fed, and collides with a pair of pull-out rollers 12 that does not rotate.

The original that has collided with the pull-out rollers 12 is conveyed for a predetermined distance from the time of the detection by the collision sensor 11, and in the event, in a state where the original is pressed against the pull-out rollers 12 with a predetermined amount of deflection, the feed motor 102 is stopped, and the movement of the feed belt 9 is stopped and falls into a standby state.

At this time, the pick-up roller 7 is retracted from the top surface of the stack of originals by rotating the pick-up motor 101, and the original is conveyed with only the conveying force of the feed belt 9, so the leading end of the original goes into a nip of paired upper and lower rollers composing the pull-out rollers 12, and an alignment of the leading end (a skew correction) is performed.

The pull-out rollers 12 has a function to correct a skew, and is rollers for conveying the original subjected to the skew correction after the separation to a pair of intermediate rollers 14. The pull-out rollers 12 is driven to rotate by reverse rotation of the feed motor 102. At this time (the reverse rotation of the feed motor 102), the pull-out rollers 12 and the intermediate rollers 14 are driven to rotate, but the pick-up roller 7 and the feed belt 9 are not driven to rotate/move.

A plurality of original-width sensors 13 are arranged to be aligned in a depth direction to detect a size of the original conveyed by the pull-out rollers 12 in the width direction (the main scanning direction) perpendicular to the conveying direction (a sub-scanning direction).

Furthermore, a length of the original in the conveying direction is detected by detecting a leading end and a trailing end of the original with the collision sensor 11 and counting the number of output pulses of the feed motor 102 for a period from the time of detection of the leading end to the time of detection of the trailing end.

When the original is conveyed from the registration unit C to the turning unit D by the rotation of the pull-out rollers 12 and the intermediate rollers 14, the conveying speed at the registration unit C is set to be higher than that is at the first reading-and-conveying unit E to shorten the processing time of conveying the original to the first reading-and-conveying unit E.

When the leading end of the original is detected by a read inlet sensor 15, before the leading end of the original goes into a nip of paired upper and lower rollers composing a pair of read inlet rollers 16, the speed reduction is started so as to conform the original conveying speed to a reading-and-conveying speed, and at the same time, the read inlet rollers 16, a pair of read outlet rollers 23, and a pair of CIS outlet rollers 27 are driven to rotate by driving a read motor 103 to rotate in the normal direction.

When the leading end of the original is detected by a registration sensor 17, the controller unit 100 causes to reduce the conveying speed of the original for a predetermined conveying distance and temporarily stop conveying the original just before the reading position of the first reading unit 20, and transmits a registration stop signal to the main-body control unit 111 via the I/F 107.

After that, when the controller unit 100 receives a read start signal from the main-body control unit 111, the original stopping for registration is conveyed with the speed increased so as to raise the conveying speed to the predetermined speed before the leading end reaches the reading position of the first reading unit 20.

Then, at a time point when the leading end of the original reaches the reading position of the first reading unit 20, which is detected by counting the number of output pulses of the read motor 103, the controller unit 100 starts transmitting a gate signal indicating an effective image area of the first side (the obverse side) of the original in the sub-scanning direction to the main-body control unit 111. The controller unit 100 keeps transmitting gate signals until the trailing end of the original goes through the reading position of the first reading unit 20.

In a case of reading an image of a single-sided original, the original passing through the first reading-and-conveying unit E is conveyed to the discharging unit G via a second reading unit 25 of the second reading-and-conveying unit F. At this time, when detecting the leading end of the original through a discharge sensor 24, the controller unit 100 drives a discharge motor 104 in the normal direction to rotate a pair of discharge rollers 28. Furthermore, just before the trailing end of the original, which is detected by counting the number of output pulses of the discharge motor 104 from the time of detection of the leading end of the original by the discharge sensor 24, goes through a nip of paired upper and lower rollers composing the discharge rollers 28, the driving speed of the discharge motor 104 is reduced to control the original discharged onto a discharge tray 29 composing the stacking unit H not to jump out of the discharge tray 29.

A first read roller 19 prevents uplift of the original in the first reading unit 20. The first read roller 19 also serves as a reference white area for acquiring shading data in the first reading unit 20.

In a case of reading images of a double-sided original, at a time point when the leading end of the original reaches the reading position of the second reading unit 25, which is detected by counting the number of output pulses of the read motor 103 from when the controller unit 100 detects the leading end of the original through the discharge sensor 24, the controller unit 100 starts transmitting a gate signal indicating an effective image area of the second side (the reverse side) of the original in the sub-scanning direction to the main-body control unit 111. The controller unit 100 keeps transmitting gate signals until the trailing end of the original goes through the reading position of the second reading unit 25.

A second read roller 26 prevents uplift of the original in the second reading unit 25. The second read roller 26 also serves as a reference white area for acquiring shading data in the second reading unit 25.

Figure 3:
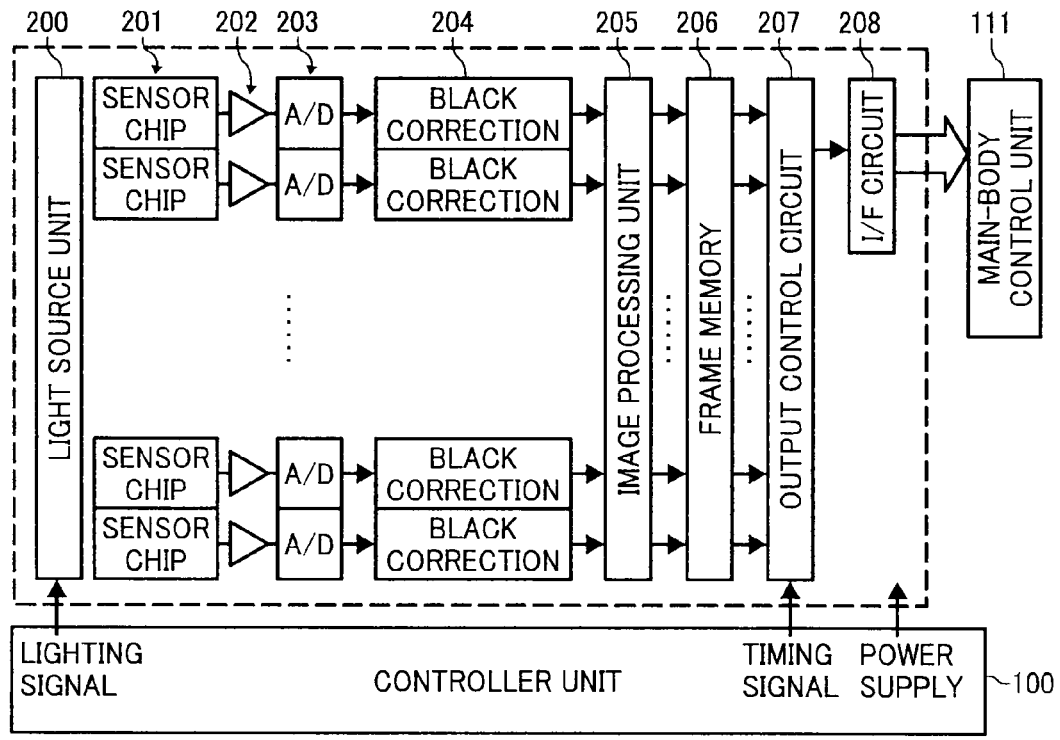
FIG. 3 is a block diagram illustrating an example of the configuration of main portions of a control system of a second reading unit shown in FIGS. 1 and 2.
Figure 8:
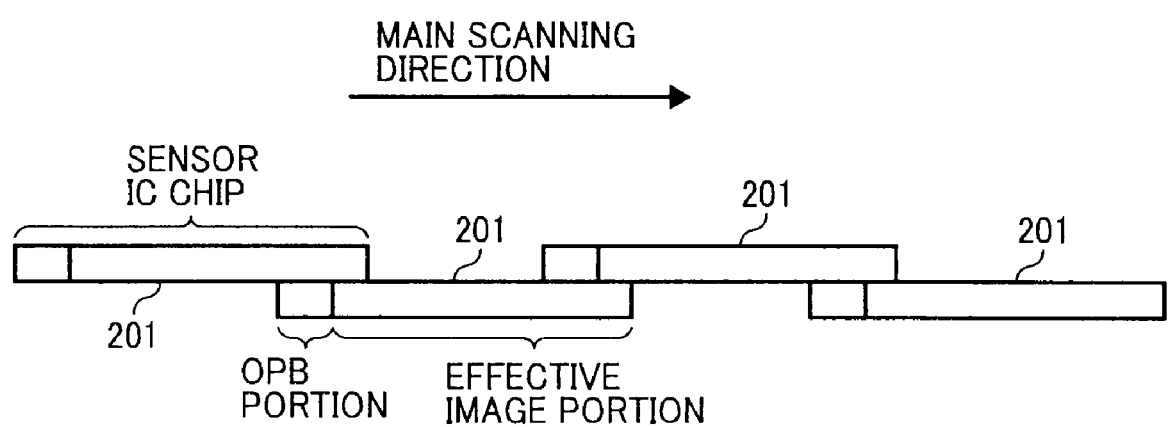
FIG. 8 is a diagram illustrating an example of alignment of a plurality of sensor chips shown in FIG. 3.

FIG. 3 is a block diagram illustrating an example of the configuration of main portions of a control system of the second reading unit 25 shown in FIGS. 1 and 2, and the portions identical to those in FIG. 8 are denoted by the same reference numerals. Incidentally, a control system of the first reading unit 20 has the same configuration as the second reading unit 25, and the description of the control system of the first reading unit 20 is omitted.

The second reading unit 25 includes a light source unit 200. The light source unit 200 can be an LED array, a fluorescent lamp, a cold-cathode tube, or the like.

The second reading unit 25 further includes an image reading means composed of a plurality of sensor IC chips (hereinafter, referred to as "sensor chips" for short) 201, which are, for example, as shown in FIG. 8, aligned in a zigzag manner along the main scanning direction (a direction corresponding to the original width direction), and a plurality of amplifier circuits 202, which are individually connected to the respective sensor chips 201, and a plurality of A/D converters 203, which are individually connected to the respective amplifier circuits 202.

An output signal (a digital image signal) of each of the A/D converters 203 includes a signal component as well as a black-level offset. Therefore, the second reading unit 25 further includes a plurality of black correction units 204 for eliminating the black-level offset.

The second reading unit 25 further includes an image processing unit 205, a frame memory 206, an output control circuit 207, and an I/F circuit 208.

Each of the sensor chips 201 includes a photoelectric conversion element referred to as a 1×-magnification CIS and a collective lens.

Before the original reaches the reading position of the second reading unit 25, the controller unit 100 transmits a lighting signal to the light source unit 200 to turn ON the light source unit 200.

Consequently, the light source unit 200 is turned on, and emits a light toward the printed side of the original to scan the printed side in the main scanning direction. Then, a reflected light reflected by the printed side of the original is, in each of the sensor chips 201, focused on the photoelectric conversion element by the collective lens, and subjected to a photoelectric conversion on a line-by-line basis to be read as an analog image signal.

The analog image signal read in each sensor chip 201 is amplified by the corresponding amplifier circuit 202, and then converted into a digital image signal by the corresponding A/D converter 203 (an A/D conversion means).

These digital image signals are each subjected to an offset correction for eliminating an offset component (a black-level correction) by the corresponding black correction unit (204), and input to the image processing unit 205 to be subjected to a shading correction, and then temporarily stored in the frame memory 206.

After that, the digital image signals temporarily-stored in the frame memory 206 are converted into a data format that can be received by the main-body control unit 111 by the output control circuit 207, and output to the main-body control unit 111 via the I/F circuit 208.

Incidentally, the controller unit 100 outputs a timing signal for letting the second reading unit 25 know a timing of when the leading end of the original comes at the reading position of the second reading unit 25 (image data after the timing is treated as effective data), a lighting signal for turning ON the light source, power supply, and the like.

The embodiments for characteristic portions of the image reading apparatus according to the invention are explained below with reference to FIGS. 4 to 7.

First, a black correction sequence according to a first embodiment is explained.

Figure 4:
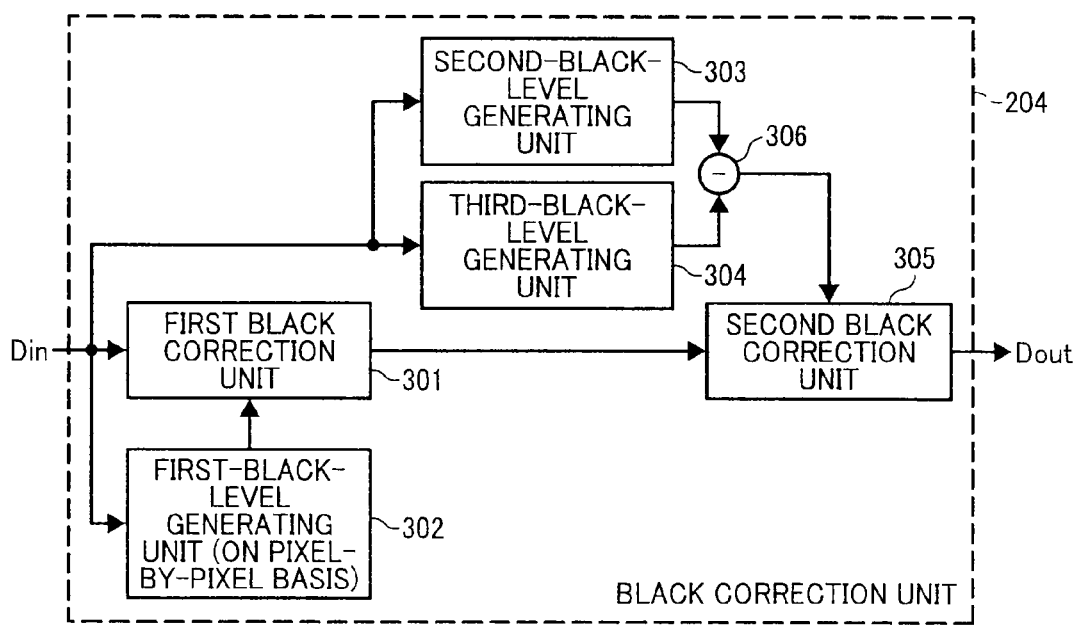
FIG. 4 is a block diagram illustrating an example of the configuration of a black correction unit shown in FIG. 3.

FIG. 4 is a block diagram illustrating an example of the configuration of the black correction unit 204 shown in FIG. 3.

The black correction unit 204 includes a first black correction unit 301, a first-black-level generating unit 302, a second-black-level generating unit 303, a third-black-level generating unit 304, a second black correction unit 305, and a difference calculating unit 306.

The first black correction unit 301 is a first offset correction means for performing an offset correction by subtracting a first black level generated by the first black-level generating unit 302 from a gray level of a digital image signal (hereinafter, referred to as "image data") output from the A/D converter 203 on a line-by-line basis when an image of an original is read.

The first-black-level generating unit 302 is a first-black-level generating means for generating, as a first black level, a gray level of image data on a pixel-by-pixel basis with the light source unit 200 turned off.

The second-black-level generating unit 303 is a second-black-level generating means for generating, as a second black level, an average of gray levels of a portion of the image data corresponding to the optical black image portions (the OPB portions) shown in FIG. 8 in the sensor chips 201 (hereinafter, referred to as "black image data") when the first-black-level generating unit 302 generates the first black level generated on the pixel-by-pixel basis.

The third-black-level generating unit 304 is a third-black-level generating means for generating, as a third black level, an average of gray levels of the black image data on a line-by-line basis when an image of the original is read.

The second black correction unit 305 is a second offset correction means for performing an offset correction by adding a calculated value calculated on the line-by-line basis by the difference calculating unit 306 to a gray level of the digital image signal subjected to the offset correction by the first black correction unit 301 on a line-by-line basis.

The difference calculating unit 306 calculates a difference between the third black level generated on the line-by-line basis by the third-black-level generating unit 304 and the second black level generated by the second-black-level generating unit 303.

Figure 5:
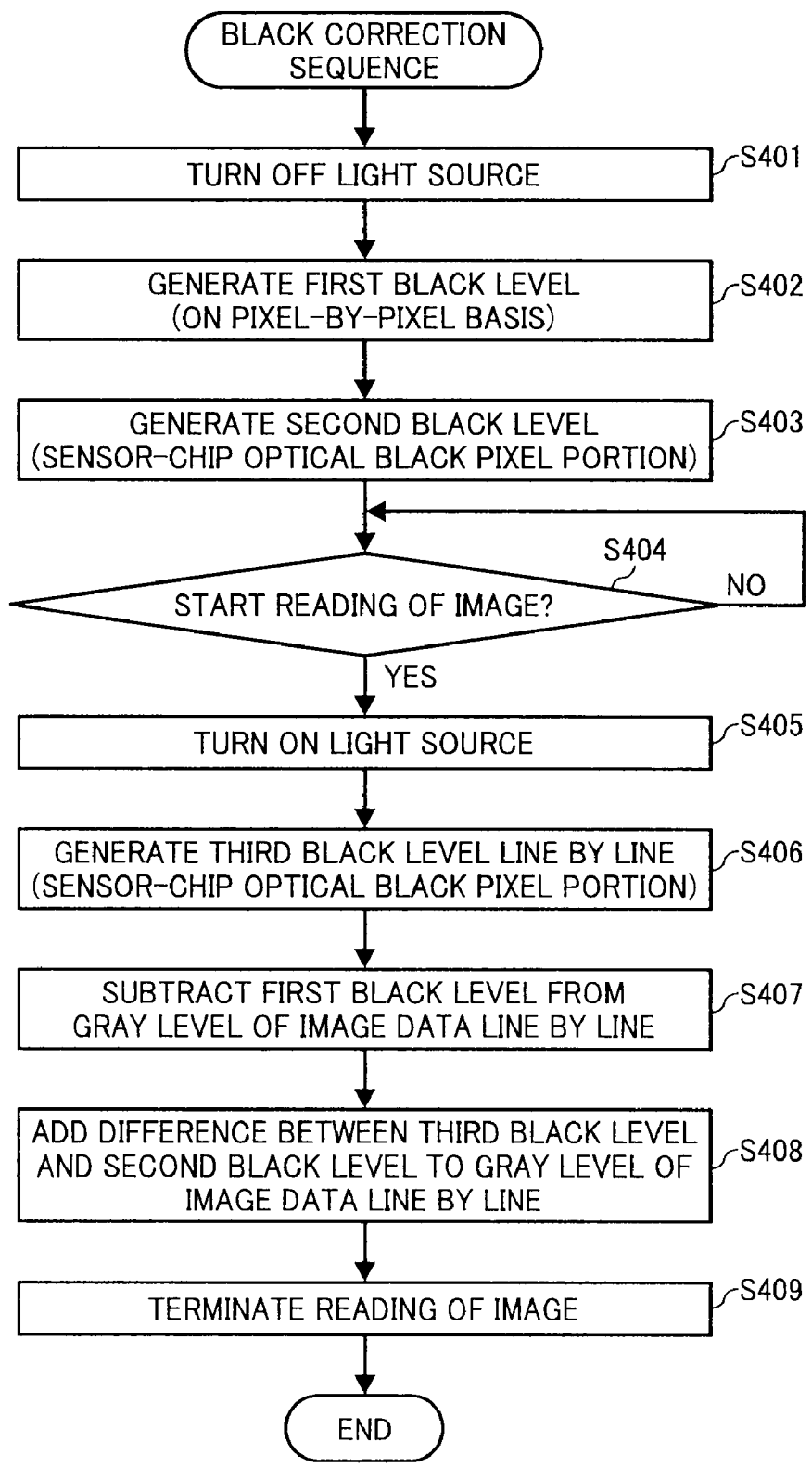
FIG. 5 is a flowchart illustrating an example of a black correction sequence performed by a controller unit shown in FIG. 2.

FIG. 5 is a flowchart illustrating an example of the black correction sequence performed by the controller unit 100 shown in FIG. 2, and shows a black-correction-data generating timing and an image correcting timing.

The controller unit 100 starts performing the black correction process shown in FIG. 5 before the second reading unit 25 starts reading an image of an original. First, the controller unit 100 causes the light source unit 200 to be turned off at Step S401, and simultaneously instructs the first-black-level generating unit 302 and the second-black-level generating unit 303 shown in FIG. 4 to generate first and second black levels, respectively, at Steps S402 and S403.

In accordance with the instruction from the controller unit 100, the first-black-level generating unit 302 generates, as the first black level, a gray level of image data pixel by pixel (on a pixel-by-pixel basis). Namely, to eliminate noise, the first black level is generated pixel by pixel by averaging of those in a specified line (a line specified in advance) in the sub-scanning direction. The first black level is held without altering until reading of an image of the original is completed.

In accordance with the instruction from the controller unit 100, the second-black-level generating unit 303 generates a second black level by averaging gray levels of black image data. Namely, to eliminate noise, the second black level is generated by averaging those in a specified line in the sub-scanning direction. The second black level is held without altering until reading of an image of the original is completed. The sensor IC of the second reading unit 25 has a configuration that the plurality of sensor chips 201 are aligned in the main scanning direction as shown in FIG. 8, and the second black level is generated individually with respect to each of the sensor chips 201.

After the processes at Steps S401 to S403, the controller unit 100 waits for an instruction for the start of reading of an image of the original from the main-body control unit 111 at Step S404. When the controller unit 100 receives the instruction for the start of reading of an image, the system control proceeds to Step S405 at a predetermined timing, and the controller unit 100 causes the light source unit 200 of the second reading unit 25 to be turned ON to cause the second reading unit 25 to start reading an image of the original.

Then, during the reading of an image of the original, the controller unit 100 instructs the third-black-level generating unit 304 (the third-black-level generating means) to generate a third black level at Step S406. Consequently, the third-black-level generating unit 304 generates a third black level by averaging gray levels of the black image data on a line-by-line basis. Namely, the third black level is generated by averaging those in the number of pixels in the black image data in the main scanning direction.

Then, the controller unit 100 instructs the first black correction unit 301 to perform an offset correction at Step S407. Consequently, the first black correction unit 301 performs an offset correction by subtracting the first black level from the gray level of the image data line by line (on a line-by-line basis).

Then, the controller unit 100 instructs the second black correction unit 305 to perform an offset correction at Step S408. Consequently, the second black correction unit 305 performs a further offset correction by adding a calculated value of "the third black level minus the second black level" to a gray level of the image data after being subjected to the offset correction at Step S407 line by line. At this time, the difference calculating unit 306 calculates "the third black level minus the second black level" line by line, and outputs the calculated value to the second black correction unit 305.

After instructing the second black correction unit 305 to perform the offset correction, the controller unit 100 terminates the reading of an image of the original at Step S409.

Here, the third black level is updated from the average of gray levels of the black image data line by line. Furthermore, the third black level is generated separately for each of the sensor chips 201.

The subtraction of the first black level is that a value held in the first-black-level generating unit 302 on the pixel-by-pixel basis is subtracted from the image data by the first black correction unit 301.

The calculated value of the difference between the third black level and the second black level is added to image data after being subjected to the subtraction by the first black correction unit 301 by the second black correction unit 305.

The calculated value of the difference is a separate value for each of the sensor chips 201.

By performing the offset correction with respect to each of the sensor chips 201 by calculating an amount of variation in black level with respect to each of the sensor chips 201 in addition to the pixel-by-pixel offset correction as described above, the variation in black level among the sensor chips 201 can be eliminated.

Subsequently, the timing to generate the first to third black levels is explained below.

Figure 6:
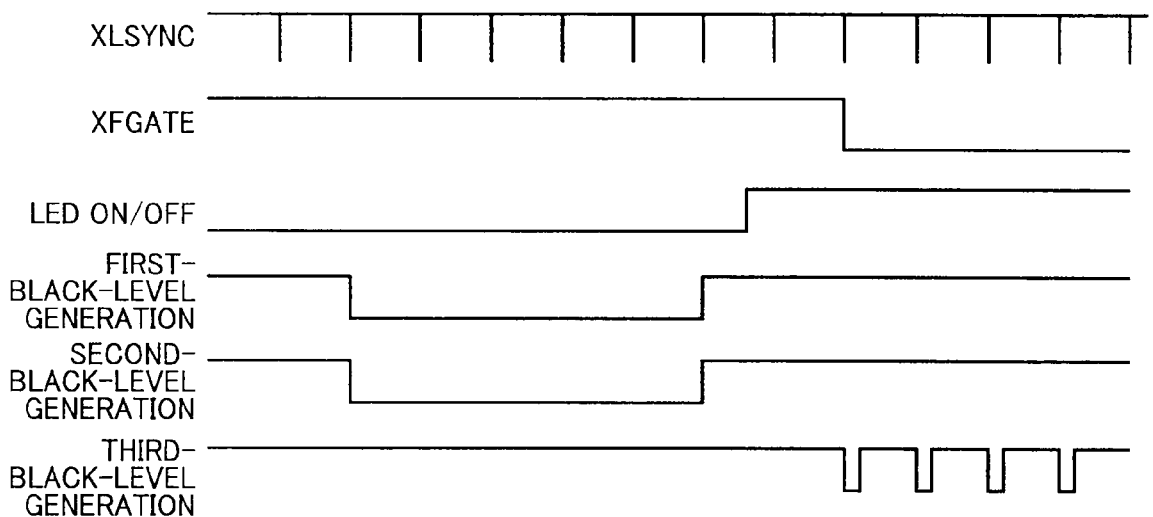
FIG. 6 is a timing chart illustrating the timing to generate first to third black levels by a first-black-level generating unit, a second-black-level generating unit, and a third-black-level generating unit shown in FIG. 4.

FIG. 6 is a timing chart illustrating the timing to generate the first to third black levels by the first-black-level generating unit 302, the second-black-level generating unit 303, and the third-black-level generating unit 304 shown in FIG. 4.

In FIG. 6, "XLSYNC" denotes a synchronization signal of a line (main scanning), and is a signal bringing to "L (low logical level)" for a few pixels at the head of each line.

Furthermore, "XFGATE" is a signal indicating an effective image area, and a period of "L" indicates an effective image area corresponding to the effective image portion shown in FIG. 8.

An "LED ON/OFF" signal is a signal defining a status of the light source unit 200, and the light source unit 200 is turned on at "H (high logical level)", and turned off at "L".

In a period of XFGATE="H", the "LED ON/OFF" signal shall be at "L", and a first-black-level generation signal and a second-black-level generation signal shall be at "L" with the light source unit 200 turned off, so first and second black levels are generated from image data in this period.

As shown in this timing chart, the black level is generated based on an average of gray levels of five lines.

In an effective image area in a period of XFGATE="L", a third-black-level generation signal shall be at "L" in a black-level period corresponding to the optical black image portion (the OPB portion), i.e., the head of each line, so the third black level is generated from an average in the black image data of the OPB portion on a line-by-line basis.

In this manner, the image reading apparatus generates, as the first black level, a gray level of image data (a digital image signal output from the A/D converter) on a pixel-by-pixel basis with the light source unit turned off, and generates, as the second black level, an average of gray levels of a portion of the image data corresponding to the optical black image portions in the sensor chips (the photoelectric conversion elements). Then, when reading an image of an original, the image reading apparatus generates, as the third black level, an average of gray levels of the portion of the image data corresponding to the optical black image portions, and performs an offset correction of the gray level of the image data based on the first black level and a difference between the third black level and the second black level. Namely, the image reading apparatus generates (updates) the third black level line by line, performs an offset correction by subtracting the first black level from the gray level of the image data line by line, and performs an offset correction by adding a difference between the third black level and the second black level to a gray level of the image data subjected to the offset correction.

When the plurality of sensor chips are aligning in a zigzag manner along the main scanning direction, the optical black image portion can be provided at an end of each of the sensor chips in the main scanning direction. As a result, even when reading of an image of an original is performed with a plurality of photoelectric conversion elements that vary in black level pixel by pixel, it is possible to perform an offset correction with respect to each of the sensor chips in addition to a pixel-by-pixel offset correction (black-level correction) as described above, and thus it is possible to suppress the variation in black level among pixels and among the sensor chips. Moreover, also in a case where the black level varies among lines, it is possible to suppress a difference in black level among the lines.

Therefore, it is possible to output image data being subjected to a high-accuracy offset correction (black-level correction), and also possible to prevent a vertical streak from occurring on an output image.

A second embodiment of the present invention is explained below. Incidentally, the second embodiment differs only slightly from the first embodiment, so that only the differences are explained below.

In the second embodiment, in the third-black-level generating unit 304 shown in FIG. 4, a value of the third black level of a previous line and a value of the third black level of a current line are subjected to weighted averaging, and the value of the third black level is updated. For example, when weighted averaging with the three-quarter weight put on the previous line and the one-quarter weight put on the current line is performed, a value of weighted-average third black level is calculated by the following equation:

Value of third black level=(value of third black level of previous line)×¾+(value of third black level of current line)×¼

In this manner, a weighted average coefficient is adjusted depending on an amount of noise by calculating the third black level as a value being subjected to weighted averaging in the sub-scanning direction, and thus it is possible to perform a high-accuracy offset correction that is not affected by noise even when the number of pixels corresponding to the optical black image portions is small.

Namely, when a plurality of sensor chips are aligned in a zigzag manner along the main scanning direction, if the number of pixels corresponding to a portion where the sensor chips are overlapped with one another is large, the accuracy of averaging for eliminating noise can be increased by increasing an area of the optical black image portions; however, the number of pixels corresponding to the overlapping portion may not be increased. In this case, if an offset correction is performed by averaging gray levels of black image data on a line-by-line basis, an accuracy of the correction is reduced due to the effect of noise; however, such a problem can be solved by the offset correction described in the second embodiment.

A third embodiment of the present invention is explained below. Incidentally, the third embodiment differs only slightly from the first embodiment, so that only the differences are explained below.

In the third embodiment, in the third-black-level generating unit 304 shown in FIG. 4, a value of the third black level is calculated from an average in a plurality of lines of the optical black image portions (the OPB portions) shown in FIG. 8. In this case, the update of the value of the third black level depends on not line by line but the number of lines of the optical black image portions (the OPB portions) subjected to the averaging.

In this manner, the third black level shall be an average in a plurality of lines, and thus a similar effect to that is in the second embodiment can be achieved.

A fourth embodiment of the present invention is explained below. Incidentally, the fourth embodiment differs only slightly from the first embodiment, so that only the differences are explained below.

Figure 7:
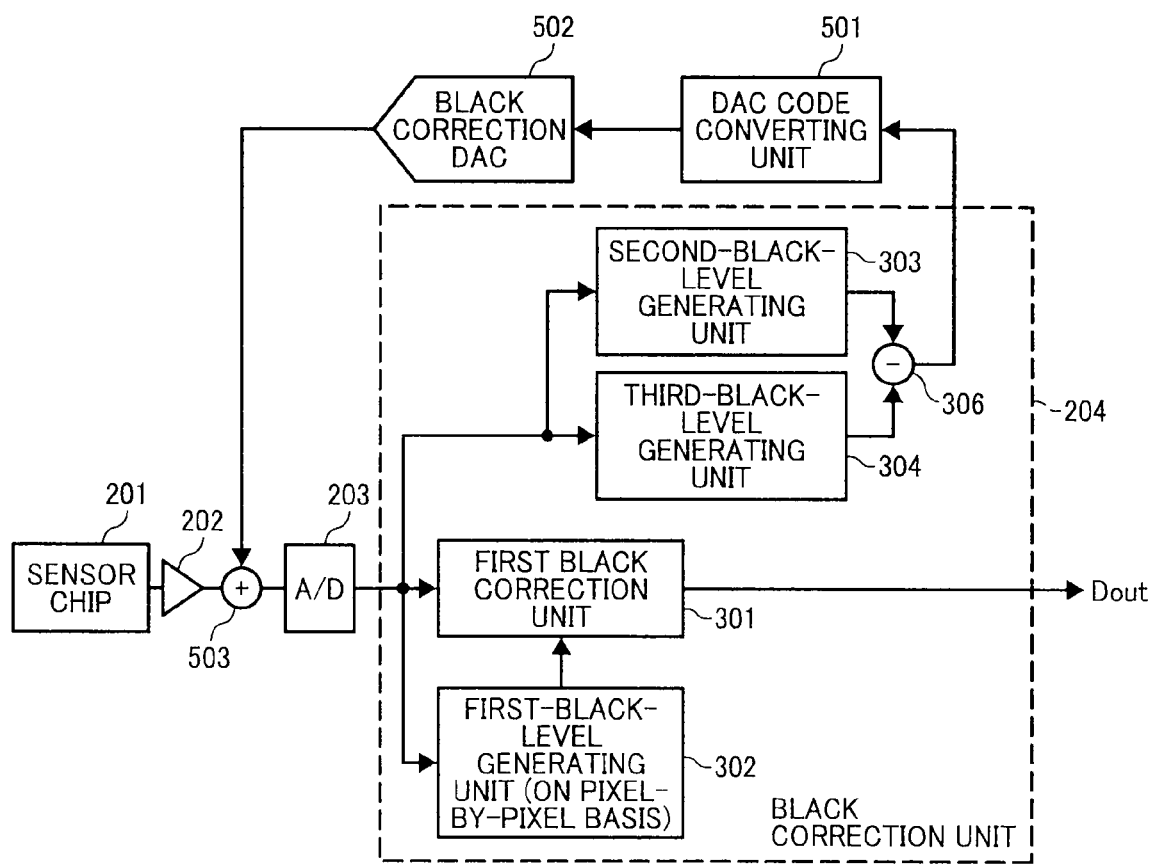
FIG. 7 is a block diagram illustrating another example of the configuration of the black correction unit shown in FIG. 3 and peripheral circuits.

FIG. 7 is a block diagram illustrating another example of the configuration of the black correction unit 204 shown in FIG. 3 and peripheral circuits. In FIG. 7, the portions identical to those in FIG. 4 are denoted by the same reference numerals.

In the fourth embodiment, as shown in FIG. 7, the second black correction unit 305 shown in FIG. 4 is removed from the black correction unit 204; instead, a DAC code converting unit 501, a black correction DAC 502, and a second black correction unit 503 are provided outside the black correction unit 204. These components are provided for each of the black correction units 204.

The DAC code converting unit 501 is a signal conversion means for converting a digital signal for black-level adjustment into a digital signal that can be input to the black correction DAC 502. The black-level adjustment indicates a calculated value, i.e., a difference between the line-by-line third black level generated by the third-black-level generating unit 304 and the second black level generated by the second-black-level generating unit 303, calculated on the line-by-line basis by the difference calculating unit 306.

The black correction DAC 502 is a D/A conversion means for converting the digital signal for black-level adjustment from the DAC code converting unit 501 into an analog signal.

In the black correction DAC 502, an analog value to be output is controlled with respect to a digital setting value. For example, if the black correction DAC 502 is an 8-bit DAC, a value of an analog voltage to be output depends on setting values "0 to 255".

Therefore, in a case of no offset correction, the setting value is set at "127", and the setting value is changed. The setting value is increased, i.e., set larger than "127", if a value of the digital signal for black-level adjustment input from the DAC code converting unit 501 (a value corresponding to the difference calculated by the difference calculating unit 306) is plus (positive). On the contrary, the setting value is decrease, i.e., set smaller than "127", if a value of the digital signal for black-level adjustment is minus (negative). In this way, an offset level of the second black correction unit 503 can be controlled.

In this case, even in a case of no offset correction, it is configured to input an analog signal, indicating a value of a reference-level analog voltage (corresponding to "0", the difference calculated by the difference calculating unit 306), to the second black correction unit 503 as the analog signal for black-level adjustment, and an offset correction of the gray level of the image data output from the A/D converter 203 can be performed by controlling the offset level of the second black correction unit 503 in such a manner that the value of the reference-level analog voltage is controlled to increase if a value of an analog voltage corresponding to a value of the digital signal for black-level adjustment input from the DAC code converting unit 501 is positive or decrease if a value of an analog voltage corresponding to a value of the digital signal for black-level adjustment is negative.

The second black correction unit 503 corresponds to a second offset correction means for performing an offset correction with respect to an analog image signal from the amplifier circuit 202 in front of the A/D converter 203 based on the analog signal for black-level adjustment output from the black correction DAC 502.

The second black correction unit 503 includes an analog adder circuit, and adds a value of an analog voltage indicated by the analog signal for black-level adjustment that is input from the black correction DAC 502 to a value of an analog voltage indicated by the analog image signal from the amplifier circuit 202 thereby performing an analog offset correction with respect to an analog image signal.

In the fourth embodiment, in the same manner as in any of the first to third embodiments, in accordance with instructions from the controller unit 100, the first-black-level generating unit 302 and the second-black-level generating unit 303 of the black correction unit 204, respectively, generate the first black level and the second black level in a state where the light source unit 200 is off, and hold the respective black levels therein, and then the third-black-level generating unit 304 generates the third black level on a line-by-line basis when an image of an original is read.

Furthermore, when receiving the second black level generated by the second-black-level generating unit 303 and the third black level generated by the third-black-level generating unit 304 on a line-by-line basis, the difference calculating unit 306 calculates a difference between the received third black level and second black level, and outputs a digital signal for black-level adjustment indicating the calculated value to the DAC code converting unit 501.

Consequently, the DAC code converting unit 501 converts the digital signal for black-level adjustment that is output from the difference calculating unit 306 into a digital signal that can be input to the black correction DAC 502, and outputs the converted digital signal to the black correction DAC 502. The black correction DAC 502 converts the digital signal into an analog signal; and the second black correction unit 503 performs an offset correction with respect to an analog image signal output from the amplifier circuit 202 based on the analog signal.

The first black correction unit 301 performs an offset correction by subtracting the first black level held in the first-black-level generating unit 302 from a gray level of a digital image signal (image data) output from the A/D converter 203 to which the analog image signal subjected to the offset correction by the second black correction unit 503 is input.

In this manner, the image reading apparatus generates, as the first black level, a gray level of image data (a digital image signal output from the A/D converter) on a pixel-by-pixel basis with the light source unit turned off; generates, as the second black level, an average of gray levels of a portion of the image data corresponding to the optical black image portions in the sensor chips; and generates, as the third black level, an average of gray levels of the portion of the image data corresponding to the optical black image portions when an image of an original is read. After that, the image reading apparatus performs an offset correction with respect to an analog image signal output from the amplifier circuit based on the first black level and a difference between the third black level and the second black level, and performs an offset correction by subtracting the first black level output from a gray level of a digital image signal output from the A/D conversion means to which the analog image signal subjected to the offset correction is input.

Furthermore, by aligning the plurality of sensor chips in a zigzag manner along the main scanning direction, the optical black image portion can be provided at an end of each of the sensor chips in the main scanning direction, so even when reading of an image of an original is performed with a plurality of photoelectric conversion elements that vary in black level pixel by pixel, it is possible to perform an offset correction with respect to each of the sensor chips in addition to a pixel-by-pixel offset correction (black-level correction) as described above, and thus it is possible to suppress the variation in black level among pixels and among the sensor chips. Moreover, also in a case where the black level varies among lines, it is possible to suppress a difference in black level among the lines.

Therefore, it is possible to output image data being subjected to a high-accuracy offset correction (black-level correction), and also possible to prevent a vertical streak from occurring on an output image.

Furthermore, a portion where an offset correction is performed can be configured in a smaller circuit size than that is configured with a digital circuit only, and thus it is possible to achieve reduction in cost.

A fifth embodiment of the present invention is explained below. Incidentally, the fifth embodiment differs only slightly from the fourth embodiment, so that only the differences are explained below.

In the fifth embodiment, in the third-black-level generating unit 304 shown in FIG. 7, a value of the third black level of a previous line and a value of the third black level of a current line are subjected to weighted averaging, and the value of the third black level is updated. For example, when weighted averaging with the three-quarter weight put on the previous line and the one-quarter weight put on the current line is performed, a value of weighted-average third black level is calculated by the following equation:

Value of third black level=(value of third black level of previous line)×¾+(value of third black level of current line)×¼

In this manner, a weighted average coefficient is adjusted depending on an amount of noise by calculating the third black level as a value being subjected to weighted averaging in the sub-scanning direction, and thus it is possible to perform a high-accuracy offset correction that is not affected by noise even when the number of pixels corresponding to the optical black image portions is small.

Namely, when a plurality of sensor chips are aligned in a zigzag manner along the main scanning direction, if the number of pixels corresponding to a portion where the sensor chips are overlapped with one another is large, an accuracy of averaging for eliminating noise can be increased by increasing an area of the optical black image portions; however, the number of pixels corresponding to the overlapping portion may not be increased. In this case, if an offset correction is performed by averaging gray levels of black image data on a line-by-line basis, an accuracy of the correction is reduced due to the effect of noise; however, such a problem can be solved by the offset correction described in the fifth embodiment.

A sixth embodiment of the present invention is explained below. Incidentally, the sixth embodiment differs only slightly from the fourth embodiment, so that only the differences are explained below.

In the sixth embodiment, in the third-black-level generating unit 304 shown in FIG. 7, a value of the third black level is calculated from an average in a plurality of lines of the optical black image portions (the OPB portions) shown in FIG. 8. In this case, the update of the value of the third black level depends on not line by line but the number of lines of the optical black image portions (the OPB portions) subjected to the averaging.

In this manner, the third black levels shall be an average in a plurality of lines, and thus a similar effect to that is in the fifth embodiment can be achieved.

An average of gray levels of the portion of the digital image signal outputted from the analog-to-digital conversion means that corresponds to the optical black image portion in the photoelectric conversion element is generated as the third black level when an image of an original is read, and an offset correction of the gray level of the digital image signal outputted from the analog-to-digital conversion means is performed based on the first black level and a difference between the third black level and the second black level. For example, the third black level is generated, and an offset correction is performed by subtracting the first black level from the gray level of the digital image signal outputted from the analog-to-digital conversion means, and then an offset correction is performed by adding the difference between the third black level and the second black level to a gray level of the digital image signal subjected to the offset correction.

Alternatively, an average of gray levels of the portion of the digital image signal outputted from the analog-to-digital conversion means that corresponds to the optical black image portion in the photoelectric conversion element is generated as the third black level when an image of an original is read, and an offset correction is performed with respect to the analog image signal read by the image reading means based on the difference between the third black level and the second black level, and then an offset correction is performed by subtracting the first black level from a digital image signal output from the analog-to-digital conversion means to which the analog image signal subjected to the offset correction is input.

The image reading apparatus according to the present invention has following advantages:

By aligning a plurality of photoelectric conversion elements in a zigzag manner along the main scanning direction, the optical black image portion (the OPB portion) can be provided at an end of each of the photoelectric conversion elements in the main scanning direction, so even when reading of an image of an original is performed with a plurality of photoelectric conversion elements that vary in black level pixel by pixel, it is possible to perform an offset correction with respect to each of the photoelectric conversion elements (sensor IC chips) in addition to a pixel-by-pixel offset correction (black-level correction) as described above, and thus it is possible to suppress the variation in black level among pixels and among the photoelectric conversion elements. Consequently, it is possible to output a digital image signal subjected to a high-accuracy offset correction (black-level correction).

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
    an image reading unit configured to scan a printed side of an original in a main scanning direction with a light source turned on and to perform a photoelectric conversion of a reflected light from the printed side on a line-by-line basis with a photoelectric conversion element to read as an analog image signal;
    an analog-to-digital conversion unit configured to convert the analog image signal read by the image reading unit into a digital image signal and outputting the digital image signal;
    a first-black-level generating unit configured to generate, as a first black level, a gray level of the digital image signal outputted from the analog-to-digital conversion unit on a pixel-by-pixel basis in a state where the light source is turned off;
    a second-black-level generating unit configured to generate, as a second black level, an average of gray levels of a portion of the digital image signal outputted from the analog-to-digital conversion unit that corresponds to an optical black image portion in the photoelectric conversion element when the first-black-level generating unit generates the first black level generated on the pixel-by-pixel basis;
    a third-black-level generating unit configured to generate, as a third black level, an average of gray levels of the portion of the digital image signal outputted from the analog-to-digital conversion unit that corresponds to the optical black image portion in the photoelectric conversion element when an image of the original is read; and an offset correction unit configured to perform an offset correction of the gray level of the digital image signal outputted from the analog-to-digital conversion unit when an image of the original is read based on the first black level generated by the first-black-level generating unit and a difference between the third black level generated by the third-black-level generating unit and the second black level generated by the second-black-level generating unit.

2. The image reading apparatus according to claim 1, wherein the offset correction unit includes:

a first offset correction unit configured to perform an offset correction by subtracting the first black level generated by the first-black-level generating unit from the gray level of the digital image signal outputted from the analog-to-digital conversion unit when an image of the original is read; and a second offset correction unit configured to perform an offset correction by adding the difference between the third black level generated by the third-black-level generating unit and the second black level generated by the second-black-level generating unit to a gray level of the digital image signal after being subjected to the offset correction by the first offset correction unit.

3. The image reading apparatus according to claim 2, wherein the third-black-level generating unit generates, as the third black level, an average of gray levels of the portion of the digital image signal outputted from the analog-to-digital conversion unit that corresponds to the optical black image portion in the photoelectric conversion element on a line-by-line basis when an image of the original is read, the first offset correction unit performs the offset correction by subtracting the first black level generated by the first-black-level generating unit from the gray level of the digital image signal outputted from the analog-to-digital conversion unit on a line-by-line basis when an image of the original is read, and the second offset correction unit performs the offset correction by adding a difference between the third black level generated on the line-by-line basis by the third-black-level generating unit and the second black level generated by the second-black-level generating unit to a gray level of the digital image signal after being subjected to the offset correction by the first offset correction unit on a line-by-line basis.

4. The image reading apparatus according to claim 3, wherein the third-black-level generating unit generates, as the third black level, a value subjected to weighted averaging in a sub-scanning direction perpendicular to the main scanning direction as the average of gray levels of the portion of the digital image signal outputted from the analog-to-digital conversion unit that corresponds to the optical black image portion in the photoelectric conversion element when an image of the original is read.

5. The image reading apparatus according to claim 3, wherein the third-black-level generating unit generates, as the third black level, an average in a plurality of lines as the average of gray levels of the portion of the digital image signal outputted from the analog-to-digital conversion unit that corresponds to the optical black image portion in the photoelectric conversion element when an image of the original is read.

6. An image reading apparatus comprising:

an image reading unit configured to scan a printed side of an original in a main scanning direction with a light source turned on and to perform a photoelectric conversion of a reflected light from the printed side on a line-by-line basis with a photoelectric conversion element to read as an analog image signal;

an analog-to-digital conversion unit configured to convert the analog image signal read by the image reading unit into a digital image signal and outputting the digital image signal;

a first-black-level generating unit configured to generate, as a first black level, a gray level of a portion of the digital image signal outputted from the analog-to-digital conversion unit that corresponds to the photoelectric conversion element on a pixel-by-pixel basis in a state where the light source is turned off;

a second-black-level generating unit configured to generate, as a second black level, an average of gray levels of a portion of the digital image signal outputted from the analog-to-digital conversion unit that corresponds to an optical black image portion in the photoelectric conversion element when the first-black-level generating unit generates the first black level generated on the pixel-by-pixel basis;

a third-black-level generating unit configured to generate, as a third black level, an average of gray levels of the portion of the digital image signal outputted from the analog-to-digital conversion unit that corresponds to the optical black image portion in the photoelectric conversion element when an image of the original is read;

a first offset correction unit configured to perform an offset correction by subtracting the first black level generated by the first-black-level generating unit from the gray level of the digital image signal outputted from the analog-to-digital conversion unit when an image of the original is read; and a second offset correction unit configured to perform an offset correction with respect to the analog image signal read by the image reading unit when an image of the original is read based on a difference between the third black level generated by the third-black-level generating unit and the second black level generated by the second-black-level generating unit, wherein the analog-to-digital conversion unit converts the analog image signal subjected to the offset correction by the second offset correction unit into a digital image signal when an image of the original is read.

7. The image reading apparatus according to claim 6, wherein the second offset correction unit includes:

a digital-to-analog conversion unit configured to convert a digital signal into an analog signal; and a signal conversion unit configured to convert a digital signal for black-level adjustment, indicating the difference between the third black level generated by the third-black-level generating unit and the second black level generated by the second-black-level generating unit, into a digital signal that can be input to the digital-to-analog conversion unit, and the second offset correction unit performs the offset correction with respect to the analog image signal read by the image reading unit based on an analog signal for black-level adjustment output from the digital-to-analog conversion unit.

8. The image reading apparatus according to claim 6, wherein
the third-black-level generating unit generates, as the third black level, an average of gray levels of the portion of the digital image signal outputted from the analog-to-digital conversion unit that corresponds to the optical black image portion in the photoelectric conversion element on a line-by-line basis when an image of the original is read,
the first offset correction unit performs the offset correction by subtracting the first black level generated by the first-black-level generating unit from the gray level of the digital image signal outputted from the analog-to-digital conversion unit on a line-by-line basis when an image of the original is read, and
the second offset correction unit performs the offset correction with respect to the analog image signal read by the image reading unit based on a difference between the third black level generated on the line-by-line basis by the third-black-level generating unit and the second black level generated by the second-black-level generating unit.

9. The image reading apparatus according to claim 8, wherein the third-black-level generating unit generates, as the third black level, a value subjected to weighted averaging in a sub-scanning direction perpendicular to the main scanning direction as the average of gray levels of the portion of the digital image signal outputted from the analog-to-digital conversion unit that corresponds to the optical black image portion in the photoelectric conversion element when an image of the original is read.

10. The image reading apparatus according to claim 8, wherein the third-black-level generating unit generates, as the third black level, an average in a plurality of lines as the average of gray levels of the portion of the digital image signal outputted from the analog-to-digital conversion unit that corresponds to the optical black image portion in the photoelectric conversion element when an image of the original is read.

11. An image reading apparatus comprising:
an image reading means for scanning a printed side of an original in a main scanning direction with a light source turned on and performing a photoelectric conversion of a reflected light from the printed side on a line-by-line basis with a photoelectric conversion element to read as an analog image signal;
an analog-to-digital conversion means for converting the analog image signal read by the image reading means into a digital image signal and outputting the digital image signal;
a first-black-level generating means for generating, as a first black level, a gray level of the digital image signal outputted from the analog-to-digital conversion means on a pixel-by-pixel basis in a state where the light source is turned off;
a second-black-level generating means for generating, as a second black level, an average of gray levels of a portion of the digital image signal outputted from the analog-to-digital conversion means that corresponds to an optical black image portion in the photoelectric conversion element when the first-black-level generating means generates the first black level generated on the pixel-by-pixel basis;
a third-black-level generating means for generating, as a third black level, an average of gray levels of the portion of the digital image signal outputted from the analog-to-digital conversion means that corresponds to the optical black image portion in the photoelectric conversion element when an image of the original is read; and
an offset correction means for performing an offset correction of the gray level of the digital image signal outputted from the analog-to-digital conversion means when an image of the original is read based on the first black level generated by the first-black-level generating means and a difference between the third black level generated by the third-black-level generating means and the second black level generated by the second-black-level generating means.

12. The image reading apparatus according to claim 11, wherein the offset correction means includes:
a first offset correction means for performing an offset correction by subtracting the first black level generated by the first-black-level generating means from the gray level of the digital image signal outputted from the analog-to-digital conversion means when an image of the original is read; and
a second offset correction means for performing an offset correction by adding the difference between the third black level generated by the third-black-level generating means and the second black level generated by the second-black-level generating means to a gray level of the digital image signal after being subjected to the offset correction by the first offset correction means.

13. The image reading apparatus according to claim 12, wherein
the third-black-level generating means generates, as the third black level, an average of gray levels of the portion of the digital image signal outputted from the analog-to-digital conversion means that corresponds to the optical black image portion in the photoelectric conversion element on a line-by-line basis when an image of the original is read,
the first offset correction means performs the offset correction by subtracting the first black level generated by the first-black-level generating means from the gray level of the digital image signal outputted from the analog-to-digital conversion means on a line-by-line basis when an image of the original is read, and
the second offset correction means performs the offset correction by adding a difference between the third black level generated on the line-by-line basis by the third-black-level generating means and the second black level generated by the second-black-level generating means to a gray level of the digital image signal after being subjected to the offset correction by the first offset correction means on a line-by-line basis.

14. The image reading apparatus according to claim 13, wherein the third-black-level generating means generates, as the third black level, a value subjected to weighted averaging in a sub-scanning direction perpendicular to the main scanning direction as the average of gray levels of the portion of the digital image signal outputted from the analog-to-digital conversion means that corresponds to the optical black image portion in the photoelectric conversion element when an image of the original is read.

15. The image reading apparatus according to claim 13, wherein the third-black-level generating means generates, as the third black level, an average in a plurality of lines as the average of gray levels of the portion of the digital image signal outputted from the analog-to-digital conversion means that corresponds to the optical black image portion in the photoelectric conversion element when an image of the original is read.

* * * * *